United States Patent
Shaheen (12)

(10) Patent No.: US 6,400,698 B1
(45) Date of Patent: Jun. 4, 2002

(54) STATE MACHINE AND RANDOM RESERVE ACCESS PROTOCOL FOR IS136 BASED TDMA PACKET DATE MOBILE STATIONS

(75) Inventor: Kamel Shaheen, Plano, TX (US)

(73) Assignee: Northern Telecom Limited, Montreal (CA)

( * ) Notice: Subject to any disclaimer, the term of this patent is extended or adjusted under 35 U.S.C. 154(b) by 0 days.

(21) Appl. No.: 09/079,998

(22) Filed: May 15, 1998

Related U.S. Application Data

(60) Provisional application No. 60/072,999, filed on Jan. 29, 1998.

(51) Int. Cl.[7] ............................................. H04Q 7/00
(52) U.S. Cl. ...................................... 370/329; 370/459
(58) Field of Search ............................... 370/319, 321, 370/322, 326, 328, 329, 330, 336, 337, 345, 347, 348, 349, 350, 437, 438, 439, 442, 443, 450, 456, 458, 459, 470

(56) References Cited

U.S. PATENT DOCUMENTS

| | | | | |
|---|---|---|---|---|
| 3,649,915 A | | 3/1972 | Mildonian, Jr. ............... | 325/42 |
| 5,276,911 A | * | 1/1994 | Levine et al. ................ | 455/510 |
| 5,280,500 A | | 1/1994 | Mazzola et al. .............. | 375/17 |
| 5,420,864 A | * | 5/1995 | Dahlin et al. ................ | 370/347 |
| 5,438,571 A | | 8/1995 | Albrecht et al. ............. | 370/94.3 |
| 5,689,503 A | * | 11/1997 | Wada et al. .................. | 370/337 |
| 5,729,541 A | * | 3/1998 | Hamalainen et al. ......... | 370/337 |
| 5,748,621 A | * | 5/1998 | Masuda et al. ............... | 370/337 |
| 5,910,949 A | * | 6/1999 | Bilstrom et al. ............. | 370/337 |

FOREIGN PATENT DOCUMENTS

| | | | | |
|---|---|---|---|---|
| WO | WO 97/34397 | | 9/1997 | ........... H04L/25/49 |

OTHER PUBLICATIONS

Copy of PCT International Search Report in Int'l. Appl. No. PCT/US00/19979.

* cited by examiner

Primary Examiner—Kwang B. Yao

(57) ABSTRACT

The software and hardware within a base station controller and within a mobile station are modified to redefine a flag which is used for controlling communications there between. Additionally, a new flag is created. The system with the modified flag and the new flag allow a channel which is carrying communication control information to be temporarily interrupted so that a data burst may be transmitted on the same channel. In general, the base station controller transmits to the mobile station a plurality of signals which include specified counter values and information relating to a plurality of flags. The preferred embodiment includes six flags and three counters. The flags include the Not Received flag, Received flag, Busy flag, Reserved flag, Idle flag, and Check flag. It is the functionality of the Idle flag which has been redefined. The Check flag is new. The methods for determining when to transmit a data burst are responsive to multiple combinations of the flags. In the preferred embodiment, only one of the Busy, Reserved, Idle and Check flags is transmitted and one of the Received/Not Received flags is transmitted. Additionally, the Partial Echo value is transmitted which identifies the last mobile station from which the base station acknowledged a data burst.

15 Claims, 5 Drawing Sheets

STATE MACHINE AND RANDOM RESERVE ACCESS PROTOCOL FOR IS136 BASED TDMA PACKET DATE MOBILE STATIONS

This application claims benefit of 06/072 999, filed Jan. 29, 1998.

CROSS REFERENCE TO RELATED APPLICATIONS

Cross reference is made to the following co-pending patent applications, each being assigned to the same assignee as the present invention and the teachings included herein by reference:

| Ser. No. | TITLE | FILED |
|---|---|---|
| 60/055,645 | PACKET DATA CONTROL CHANNEL FEEDBACK (PCCF) AND MOBILE STATE MACHINE | 8-14-97 |
| 60/062,911 & 09/121,775 | PACKET CONTROL CHANNEL STRUCTURE AND MOBILE STATE MACHINE | 10-21-97 |
| Provisional 60/072,999 & 09/079,998 | STATE MACHINE AND RANDOM RESERVE ACCESS PROTOCOL FOR IS136 BASED TDMA PACKET DATE MOBILE STATIONS | 01-29-98 |

BACKGROUND OF THE INVENTION

1. Field of the Invention

The present invention relates to wireless communications and more particularly to TDMA packet data.

2. Description of Related Art

Wireless communication systems under current development are often being designed to include enhanced capabilities to support the transmission of data. Wireless communication systems under current development are often being designed to include enhanced capabilities to support the transmission of data information. Wireless network communications for controlling data transfer typically are more complicated than wireless communications for controlling conversation.

Wireless data communication typically is more complicated than wireless voice communication since the data channel may provide both control and data transfer capabilities. Further, all data terminals share the resources of the data channel.

Accordingly, the multiplexing between control messages and data transfer messages requires greater control mechanisms than those ordinarily required for controlling conversation between individuals on the voice network.

Because of the multiplexing of control and data transfer on one channel, the data transfer may occupy the channel for extended periods of time limiting the control bandwidth.

There is a need, therefore, for communication networks and corresponding communication control protocols that need to be adapted to be responsive to new problems that are created as a result of new air interface resource allocation needs in order to improve network efficiencies.

SUMMARY OF THE INVENTION

Common message volume for data transfers are now often extended or larger in comparison to message sizes used to set up a conversation between two communication devices. Accordingly, the extended message volume can result in certain mobile stations capturing a communication control channel for longer periods of time. Under current technology, other mobile stations are not allowed to access the channel until the transmission is complete. In the current invention, however, an apparatus and a method is disclosed for interrupting the transmission of a particular control message to facilitate the intermittent transmissions of smaller messages thereby decreasing access delays for mobile stations and reducing the queuing delay in base stations and, accordingly, increasing network efficiencies.

More particularly, the Idle flag which has been previously used in control related communications between a base station and a mobile station to cause the mobile station to abort the current access attempt and/or to seek a new access opportunity has been functionally redefined to merely cause the mobile station to suspend communications on the channel but to not abort or seek an alternate channel for continuing communications. In the inventive system however, the Idle flag is used, in part, to suspend communications on a channel to allow another mobile station to use the channel. Accordingly, the Idle flag is used to allow any mobile station within the service area which is seeking an access opportunity to access the channel. An additional control flag is created which prompts a specific mobile station to start or continue a particular signal transmission. The Check flag will allow a particular mobile station identified by its Partial Echo to access or use the channel. Neither the Idle or Check flags cause the original channel owner to lose the channel. The existing IS-136 access protocol is modified to include processing capability for the redefined Idle flag as well as for the new Check flag.

An inventive method includes the step of changing or seeking new channels for communications whenever a first specified flag has been set and a specified period of time has elapsed since the flag was set or whenever a second specified flag has been set. More specifically, a data packet is transmitted in a first embodiment in the form of a burst whenever an Idle flag is set. In another embodiment, a burst is transmitted whenever a Check flag is set and a Partial Echo transmitted by the base station matches the identity of the mobile station. In another embodiment, a burst is transmitted if a Reserved flag is set and a Partial Echo transmitted by the base station matches the mobile station identity. In yet another embodiment, a burst is transmitted whenever the Reserved or the Check flags are set and the Partial Echo matches.

DETAILED DESCRIPTION OF THE INVENTION

Figure 1A:
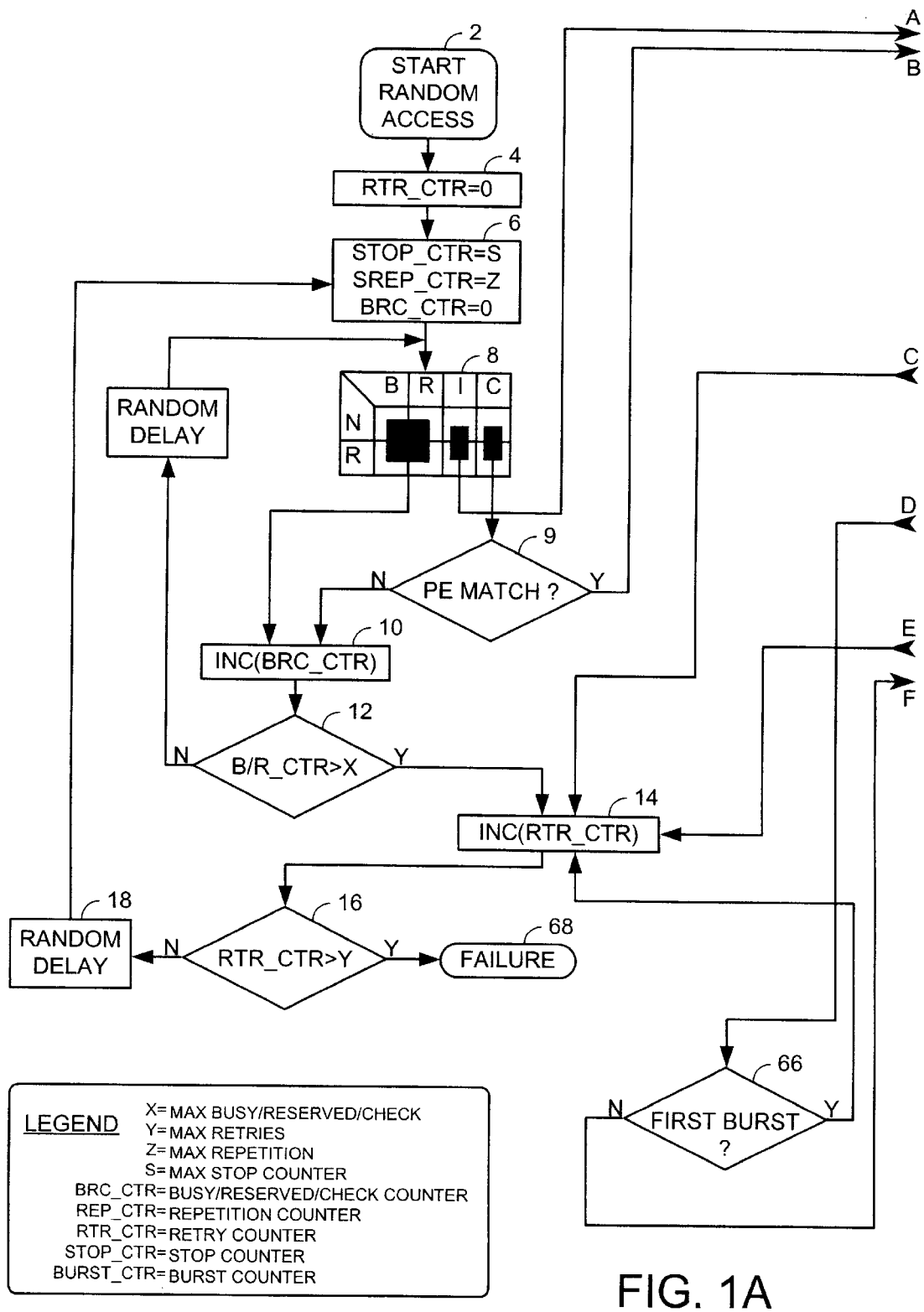
FIGS. 1A through 1C are logic diagrams which illustrate a method for communicating according to a preferred embodiment of the invention.
Figure 1B:
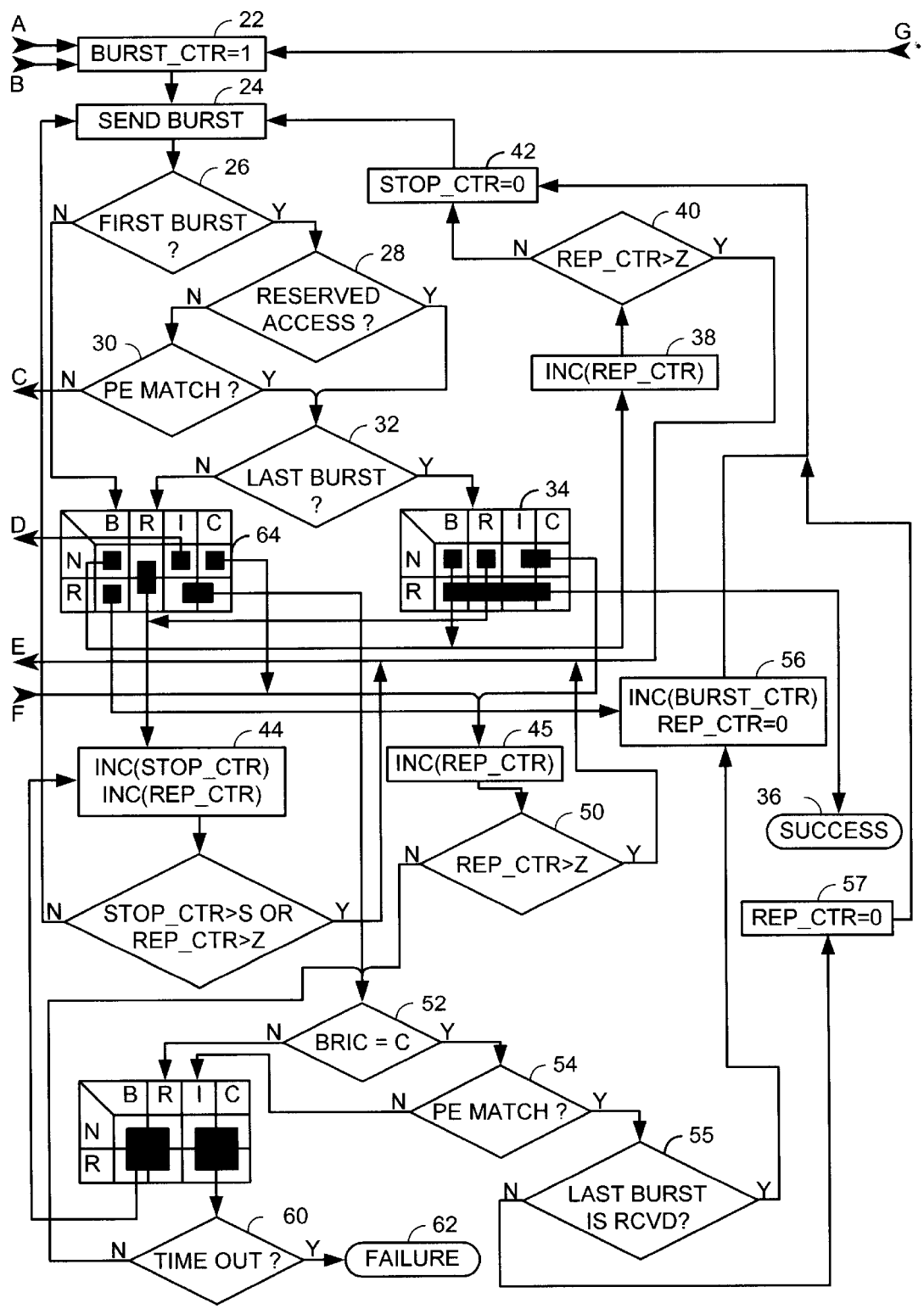
Figure 1C:
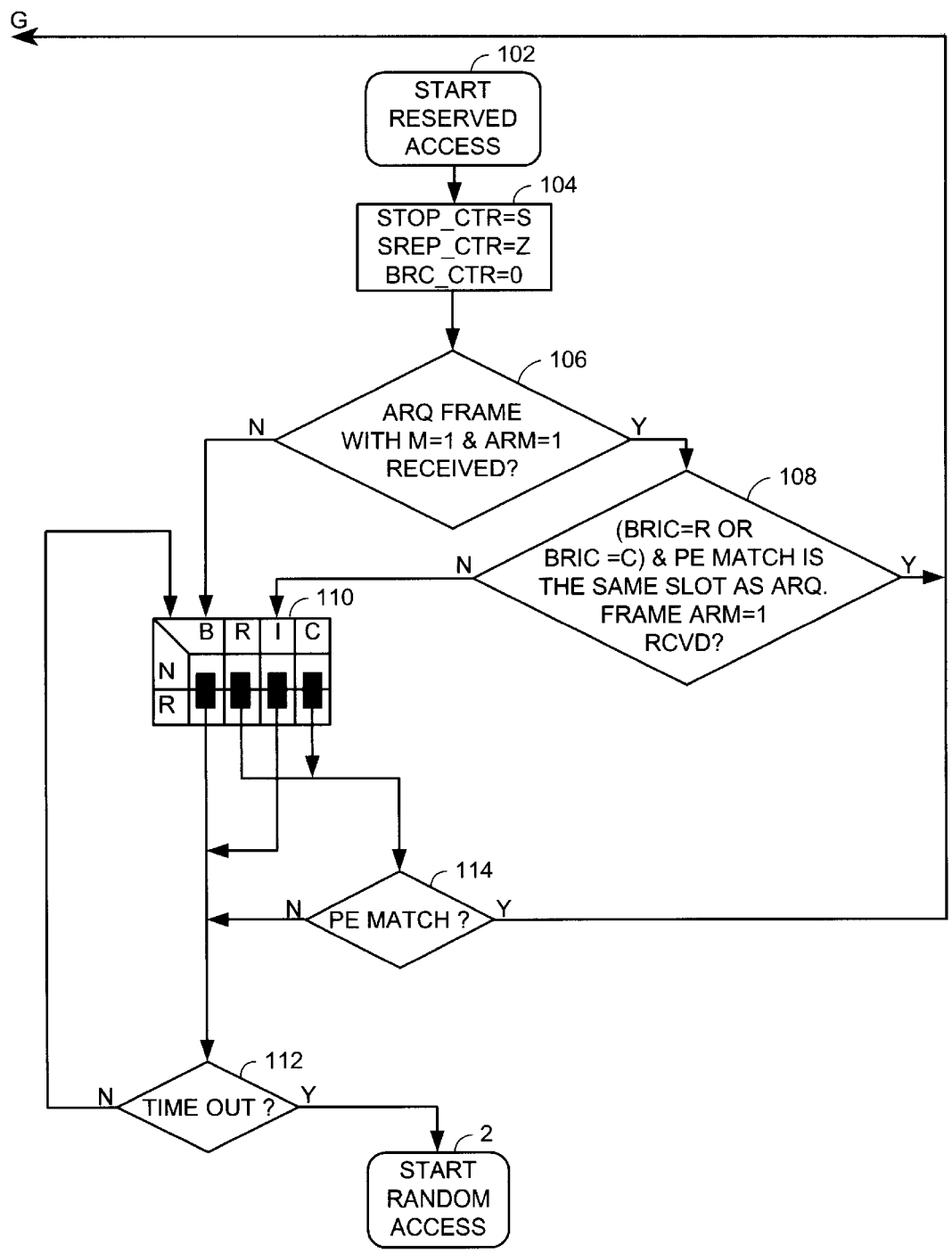

FIGS. 1A through 1C are logic diagrams which illustrate a method for communicating according to a preferred embodiment of the invention. The methods of FIGS. 1A through 1C may be practiced in any known communication network which includes a base station and a mobile transceiver and which is modified to functionally include the flags which are described in relation to FIGS. 1A through 1C. Referring now to FIGS. 1A through 1C, the inventive method may be initiated either at steps 2 or 102. For description purposes, the method originates with step 2. Initially, a first specified set of counters is set to initial specified values (step 4). In the preferred embodiment, an Rtr_ctr counter is set equal to zero. The Rtr_ctr counter is the retry counter. In the preferred embodiment, the first specified set of counters is comprised of only one counter. Thereafter, a second set of specified counters are set to initial values as received over the air interface from an external source (step 6). Here, the Stop_ctr counter is set equal to the value "S", the Srep_ctr counter is set equal to "Z" and the BRC_ctr counter is set to "0". The Stop_ctr counter is the stop counter. In general, Z, S and 0 are the maximum number of repetitions that are allowed for each of the Srep_ctr, Stop_ctr and BRC_ctr counters.

Thereafter, the status of a set of events and or flags are checked to determine overall communication status (step 8). More specifically, the Busy, Reserved, Idle, Check, Received and Not Received flags are checked to determine communication status. Each of these flags is set by an external base station in response to a last communication attempt by the mobile station and is transmitted to the mobile station. In general, the Busy flag is set by the base station and transmitted to the mobile station whenever it determines that a specified channel for which it wants to communicate is busy. The Reserved and Idle flags are set according to whether the base station has indicated that the specified channel is reserved for another communication, or whether the mobile station should wait for a period of time prior to seeking a new channel. The Check flag is set by the base station to indicate whether the base station is waiting for acknowledgment or to receive communication signals from a particular mobile station. The Received and Not Received flags are set according to signals received from the base station which indicate whether the last transmitted communication signal from the mobile station was received or not received by the base station. After receiving a Check flag, the mobile station compares a Partial Echo signal transmitted by the base station to its Id to determine whether the base station has received and acknowledged a burst transmitted by the mobile station (step 9). In general, the Partial Echo identifies which mobile station is being acknowledged. In the preferred embodiment, only one of the Received and Not Received flags, and only one of the Busy, Reserved, Idle and Check flags are transmitted by the base station.

As may be seen from referring to FIGS. 1A through 1C, if either the Busy or Reserved flags are set, regardless of whether the Received or Not Received flags were set, the BRC_ctr counter is incremented (step 10). The BRC_ctr counter is the Busy/Reserve/Check counter. Thereafter, the incremented counter is examined to determine whether it has exceeded a specified value X (step 12). In general, X is the maximum number of times that the Busy/Reserved/Check flags may be received during an access attempt. In the system of FIGS. 1A through 1C, X is an amount stored in the mobile station memory. The value X is specified by the base station and transmitted to the mobile station over the air interface in an alternate embodiment of the invention. If the specified value X has not been exceeded, a random delay is introduced prior to the analysis of step 8 being repeated. If the specified value X has been exceeded, then the Rtr_ctr counter is incremented (step 14). This second counter keeps track of the number of retry attempts. In general, the retry counter counts how many times the mobile has retried to obtain access on a specified channel. After the retry counter has been incremented, the inventive method includes determining whether the retry counter has exceeded a specified value Y (step 16). In general, Y is the maximum number of retry attempts allowed. Y is an amount which, similar to X, is stored in the mobile station memory. If the Y specified retry attempts have not been exceeded, a random delay is introduced (step 18) prior to resetting the counters of step 6 and performing the determinations and methods of step 8. This random delay may typically vary from zero to six TDMA blocks (20 ms each). If the specified value Y of the retry counter has been exceeded, then the system determines that access to the specified channel was not available and that communications on the specified channel can not be made (step 68).

Going back to the method of step 8, if, instead of the Busy or Reserved flags being set, the Idle flag is set, then the burst counter is set to an initial value of one (step 22). Thereafter, a burst (TDMA data packet) is transmitted (step 24) over a specified TDMA control channel. A channel is commonly considered to be a period of time (a time slot) for a given frequency at a specific frequency within a frequency band. By burst, what is meant is that a communication signal is transmitted over the specified channel.

After the burst has been transmitted in step 24, a determination is made as to whether the last transmitted burst was the first burst (step 26). If not, the B, R, I, C, N and R flags are analyzed again (step 64). In the determinations of step 64, unlike the determinations of step 8, the status of the Received or Not Received flags have an impact as to subsequent steps. If the Busy flag is set and the Not Received flag is set, the Rep_ctr counter is incremented (step 38). The Rep_ctr counter is the repetition counter. If the Busy and Received flags are set, the Burst_ctr counter is incremented and the Rep_ctr counter is set to 0 (step 56). The Burst_ctr counter is the burst counter. On the other hand, if the Reserved flag is set, then the Stop_ctr and the Rep_ctr counters are both incremented (step 44). If the Idle flag and the Not Received flags are set, then the method of step 66 is performed. If the Check flag and the Not Received flags are set, the Rep ctr counter is incremented (step 45). If the Received flag is set and either the Idle or Check flags are set, a determination is made as to whether it was the Check flag which was set (step 52). If so, a determination is made as to whether the Partial Echo signal transmitted by the base station matches the mobile station Id (step 54). In other words, has the base station acknowledged receiving the communication signal last transmitted by the base station. If so, a determination is made as to whether the last burst was received (step 55). If the last burst was received, the Burst_ctr counter is incremented and the Rep_ctr counter is set equal to 0 (step 56). If the last burst was not received (as determined in step 55, the Rep_ctr counter is set equal to zero (step 57). Thereafter, the Stop_ctr counter is set equal to 0 (step 42) and a burst is transmitted again (step 24).

Going back to step 54, if the Partial Echo did not match, then the B, R, I, C, N and R flags are examined and analyzed to make determinations similar to those of steps 8 and 64 (step 58). If either the Busy or Reserved flags are set, the Stop_ctr and Rep_ctr counters are incremented (step 44). If the Idle or Check flags are set, then the mobile stations determines whether a specified time out value has been exceeded (step 60). If not, the mobile station determines whether the Check flag is set (step 52) and whether the Partial Echo matches (step 54). If the time out value has been reached or exceeded, transmission on the specified channel is terminated (step 62).

Continuing to examine FIGS. 1A through 1C, if the mobile station determines in step 26 that a first burst was transmitted in step 24, then it determines whether Reserved Access exists (step 28). If not, then the mobile station determines whether the Partial Echo signals match (step 30). If the Reserved Access does exist, or if the Partial Echo matches, then the mobile station determines whether the last burst to be transmitted has been transmitted (step 32). If not, the analysis and determinations of step 64 are made. If the last burst has been transmitted, then the B, R, I and C flags are analyzed (step 34) as follows. If the Received flag is set thereby indicating that the last burst was received, the entire transmission is deemed a success and transmission is terminated (step 36). If the last burst is not received and the Busy flag is set, then the Rep_ctr counter is incremented (step 38). Thereafter, the mobile station determines whether the Rep_ctr counter has exceeded a maximum value "Z" (step 40). If not, the Stop_ctr counter is set equal to zero (step 42). If the Rep ctr counter has exceeded the maximum value Z, then the Rtr_ctr counter is incremented (step 14). If the Reserved and the Not Received flags are set, then the Stop_ctr and Rep_ctr counters are incremented (step 44). Thereafter the mobile station determines whether the Stop_ctr exceeds a maximum value "S" or the Rep_ctr counter exceeds the maximum value "Z". If neither maximum value is exceeded, a burst is transmitted (step 24). If either the Stop_ctr or Rep_ctr counter has exceeded a maximum value, the Rtr_ctr counter is incremented in step 14.

If the Idle or Check flags are set and the Not Received flag is set, then the Rep_ctr counter is incremented (step 45). Thereafter, the mobile station determines whether the Rep_ctr counter has exceeded the maximum specified value "Z" (step 50). If so, the Rtr_ctr counter is incremented (step 14). If not, a determination is made as to whether the Check flag has been set. In the preferred embodiment, the S, X, Y and Z counter values are specified over the air interface by the base station.

Referring again to FIGS. 1A through 1C, if the inventive method starts with step 102 for Reserved Access, the Stop_ctr, Srep_ctr and BRC_ctr counters are set to the initial values as received over the air interface from the base station (step 104). This step is similar to step 6. Thereafter, the mobile station checks to see if the specified channel has been reserved for it (step 106). Thereafter, the mobile station will determine the status of the channel, whether it is reserved or check with a match of the Partial Echo at the same channel open frame time slot as a defined auto retransmission request frame, i.e., ARM signal set equal to one is received. In general, step 108 includes determining whether a particular frame should be retransmitted on a particular time slot and determining if it has been received. If the channel has been reserved for the retransmission, then the retransmission will occur. If, the mobile station determines that the particular channel is not reserved, then the B, R, I,.C, N and R flags are analyzed (step 110). This time, similar to the analysis of step 8, the status of the Received and Not Received flags is not significant. If the Busy flag is set, the mobile station determines whether a specified time out value has been reached. If so, the random access method is reinitiated at step 2. If not, the B, R, I and C flags are analyzed again (step 110). If the Reserved flag is set, or if the Check flag is set, then the mobile station determines whether the Partial Echo matches (step 114). If not, it determines whether a time out value has been reached (step 112). If the Partial Echo does match, then the Burst_ctr counter is set equal to 1 (step 22), and a burst is transmitted (step 24).

The above description of FIGS. 1A through 1C are, in general, a TDMA packet data access protocol for operation in the PCCH/PTCH control channels in a communication network. In the preferred embodiment, each of the BRC_ctr, Srep_ctr and Stop_ctr and Burst_ctr parameters are transmitted over the air interface from the base station to the mobile station. The X, Y, Rtr_ctr and Burst_ctr counters are stored in the mobile memory. Each of the counters, in alternate embodiments are specified by the base station over a defined air interface. It is understood that minor modifications to the methods and generation of flags as described with respect to FIGS. 1A through 1C may be made without departing from the scope of the invention.

Figure 2:
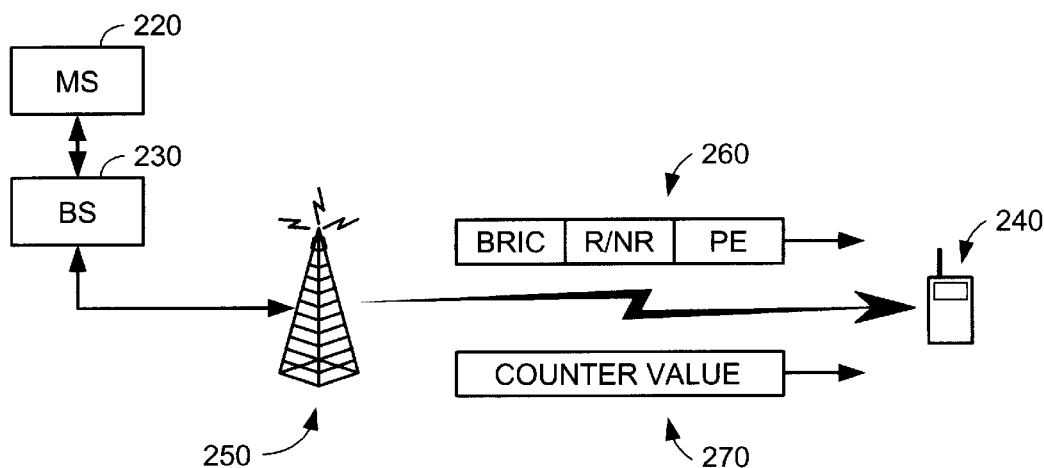
FIG. 2 is a diagram which illustrates a wireless communication network according to one aspect of the preferred embodiment of the invention.

FIG. 2 is a diagram which illustrates a wireless communication network according to one aspect of the preferred embodiment of the invention. Referring now to FIG. 2, a mobile switching center (MSC) 220 is connected to a base station 230 which is in communication with a mobile station 240 through antenna 250. In operation, MSC 220 serves to control communication links between base station 230 and mobile station 240. Base station 230 is operable to generate and interpret communication signals transmitted and received by antenna 250 with mobile station 240. More specifically, base station 230 generates communication signals 260 and 270 which are transmitted to mobile station 240. In the preferred embodiment, communication signal 260 includes a first field which is comprised of one of the Busy, Reserved, Idle or Check flags, each having one of a plurality of values. Communication signal 260 also includes a field which is comprised of at least one flag that indicates whether a last transmission burst by mobile station 240 was Received or Not Received. In the preferred embodiment, only one flag is transmitted in this field wherein the value of the flag reflects a Received or Not Received status. In alternate embodiments, however, one of a plurality of flags maybe transmitted in this field. These plurality of flags include a Received flag and a Not Received flag. A third field of communication signal 260 includes a Partial Echo value which identifies the mobile station 240 from which it received a data burst.

Continuing to refer to FIG. 2, base station 230 also transmits a communication signal 270 from antenna 250 to mobile station 240. Communication signal 270 includes a plurality of fields, each of which carries a specified counter value. In the preferred embodiment, the specified counter values includes the Stop_ctr, Srep ctr and BRC_ctr counters.

Figure 3:
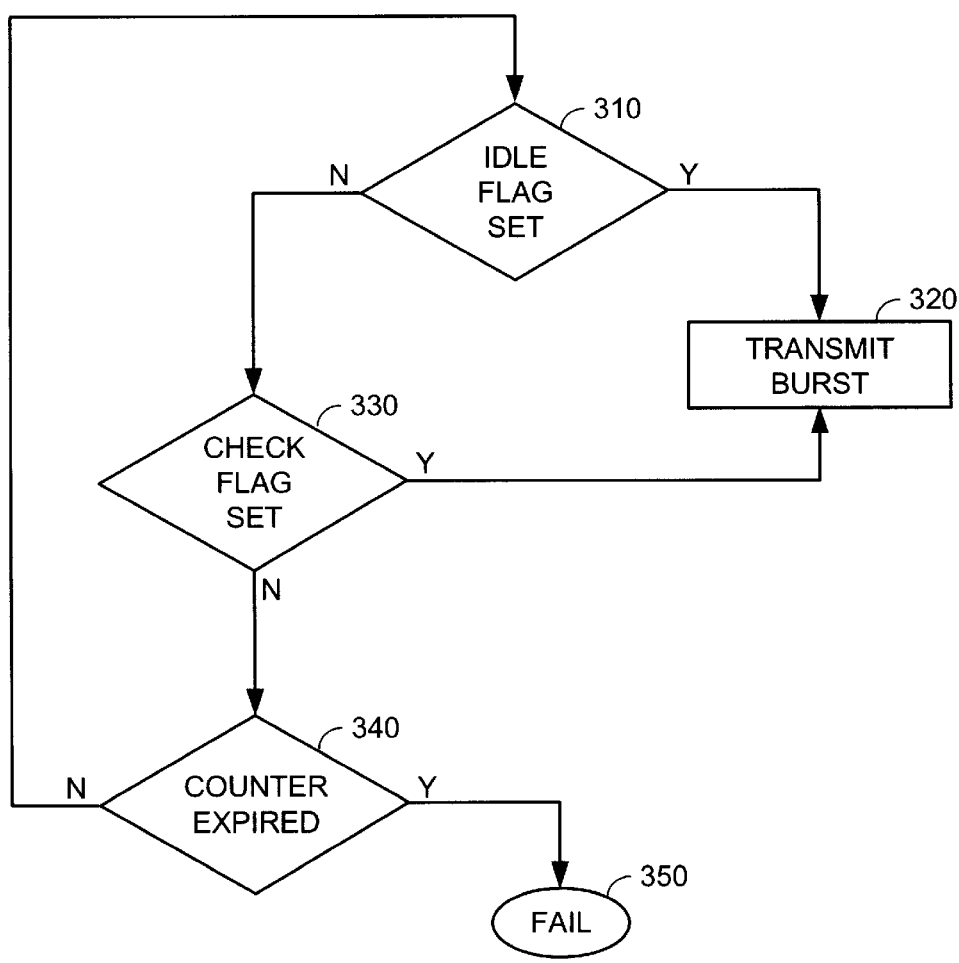
FIG. 3 is a logic flow diagram which illustrates a method for controlling communications as performed by a mobile station according to a preferred embodiment of the inventive method.

FIG. 3 is a logic flow diagram which illustrates a method for controlling communications as performed by a mobile station according to a preferred embodiment of the inventive method. Referring now to FIG. 3, a mobile station determines whether a communicating base station has transmitted the Idle flag (step 310). For example, referring again to FIG. 2, mobile station 240 determines whether base station 230 transmitted an Idle flag in the first field of communication signal 260. If the Idle flag was transmitted and was set, mobile station 240 transmits a data burst (step 320). If the Idle flag was not set, the mobile station determines whether the Check flag was transmitted and set (step 330). In one embodiment of the invention, the transmission of a specified flag represents that the flag is set. In another embodiment however, a first signal identifies the flag being transmitted and a second signal identifies the logical value of the flag. Referring again to FIG. 3, if the Check flag was set, then a burst is transmitted (step 320). If the Check flag is not set, then the mobile station determines whether a specified counter has expired (step 340). If the specified counter has expired, the access attempt for a specified channel is deemed a failure (step 350). If the counter has not expired, then the method reverts to step 310 to determine whether the Idle flag has been set.

Figure 4:
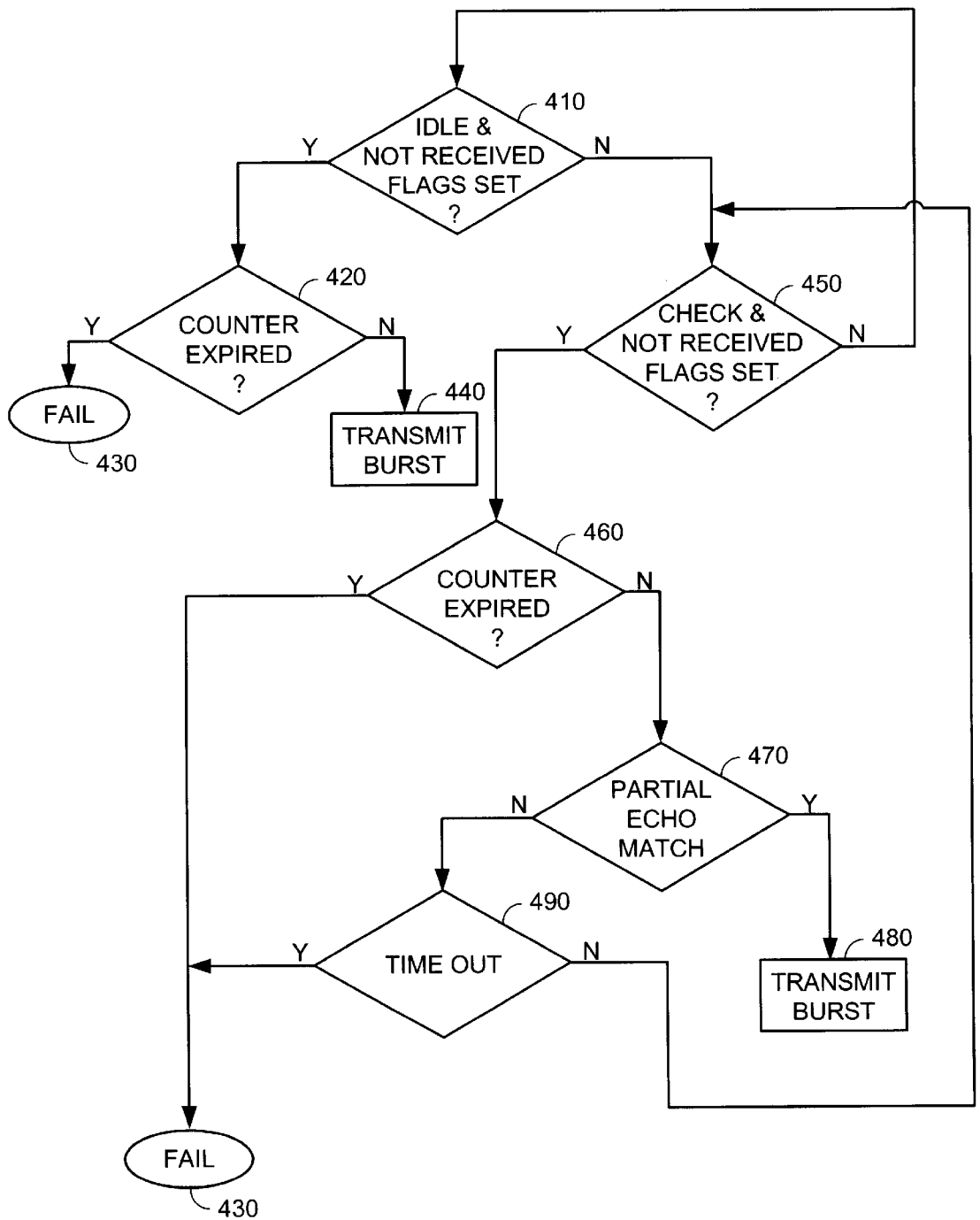
FIG. 4 is a logic flow diagram which illustrates a method for controlling communications as performed by a mobile station according to a second preferred embodiment of the inventive method.

FIG. 4 is a logic flow diagram which illustrates a method for controlling communications as performed by a mobile station according to a second preferred embodiment of the inventive method. Referring now to FIG. 4 a mobile station determines whether the Idle and the Not Received flags are both set (step 410). If yes, the mobile station determines whether at least one specified counter has expired (step 420). If at least one specified counter has expired, the access attempt for a specified channel is failed (step 430). If the counter has not expired, a data burst is transmitted by the mobile station (step 440). If the mobile station decides in step 410 that the Idle and the Not Received flags are not both set, then it determines whether the Check and the Not Received flags are both set. If not, step 410 is repeated. If yes, the mobile station determines whether at least one specified counter has expired (step 460). If yes, the access attempt to a specified channel is deemed failed (step 430). If not, the mobile station determines whether a Partial Echo signal transmitted by the base station matches the identity of the mobile station (step 470). If a Partial Echo match exists, a data burst is transmitted (step 480). If the Partial Echo does not match, the mobile station determines whether the specified time out period has expired (step 490). If so, the access attempt for a specified channel is failed (step 430). If the time out period has not expired, then step 450 of determining whether a Check & Not Received flag is set.

As may be seen, the present invention allows mobile stations, with small volumes of data transmissions to interrupt larger sized data transmissions. In some cases, this invention reduces the backlog of pending stations and thereby increases network efficiencies. The present invention is believed to be especially effective when configured and employed as described herein. Those skilled in the art, however, will readily recognize that numerous variations and substitutions may be made in the invention and its use and configuration to achieve substantially the same results as achieved by the embodiments and, in particular, the preferred embodiments described herein. Each variation is intended to be included in the description herein and forms a part of the present invention. The foregoing detailed description is, thus, to be clearly understood as being given by way of illustration and example only, the literal and equivalent scope of the present invention being limited solely by the claims.

What is claimed is:

1. A method for transmitting a data burst from a mobile unit to a base station over a wireless medium, comprising the steps of:
   receiving a signal from the base station, which signal includes an Idle flag, a Check flag and a Partial Echo;
   determining if the Idle flag has been set;
   determining if the Check flag has been set;
   determining if the Partial Echo matches an Id number of the mobile station; and
   transmitting a burst.

2. The method of claim 1 wherein the transmitting step only occurs whenever the Idle flag has been set and whenever the Check flag is set and the Partial Echo matches the Id number of the wireless mobile station.

3. The method of claim 2 which further includes the step of determining if a last transmitted burst was received by a receiving wireless base station.

4. The method of claim 3 wherein the transmitting step occurs when one of the Idle or Check flags is set.

5. The method of claim 3 wherein the transmitting step occurs whenever the Partial Echo matches the Id number of the wireless transceiver and a last data burst was received.

6. The method of claim 1 which further includes the step of determining if a specified time value has elapsed wherein the burst is not transmitted once a specified amount of time has elapsed since a first attempt to access a channel or since an attempt to transmit a burst.

7. The method of claim 6 wherein the transmitting step occurs whenever the Check flag has been set and there is no Partial Echo match.

8. A method for transmitting a communication control signal in the form of a data burst over a specified channel from a wireless mobile station over a wireless medium, comprising the steps of:
   analyzing the flag status for a plurality of flags to determine when a first flag has been set by a base station controller wherein setting of the first flag indicates that the mobiles station must suspend but not terminate communications on the specified channel; and
   suspending communications on the specified channel.

9. The method of claim 8 which further includes the step of seeking a new channel for transmitting communication signals whenever the first flag has been set and a specified period of time has elapsed.

10. A wireless transceiver system, comprising:
    circuitry for transmitting a first communication signal which includes a first field for containing at least one of a first plurality of flags wherein the at least one of the first plurality of flags represents a first control signal for causing a receiving transceiver to suspend communications on a specified control channel; and
    circuitry for transmitting a second communication signal which includes a plurality of specified counter values.

11. The circuitry of claim 10 wherein the first plurality of flags further includes a flag representative of a second control signal for indicating that the specified channel is busy.

12. The circuitry of claim 10 wherein the first plurality of flags further includes a flag representative of a third control signal for indicating that the specified channel is reserved.

13. A method for transmitting a data burst from a wireless base station over a wireless medium, comprising the steps of:
    determining if an Idle flag is set;
    if the Idle flag is not set, determining if a Check flag is set; and
    transmitting a burst if one of the Idle flag or Check flag is set.

14. The method of claim 13 which further includes the step of determining if a counter has expired.

15. A method for transmitting a data burst from a wireless mobile station over a wireless medium, comprising the steps of:
    analyzing the flag status for a plurality of flags to determine when an Idle flag has been set;
    analyzing the flag status for a plurality of flags to determine when a Check flag has been set;
    analyzing the flag status for a plurality of flags to determine when a Reserved flag has been set;
    analyzing the flag status for a plurality of flags to determine when a Busy flag has been set;
    if a specified amount of time has expired since one of the Busy and Idle flags was set, setting a plurality of counters to specified values and then transmitting a burst; and
    if one of the Reserved or Check flags is set, determining if a Partial Echo match exists and, if so, transmitting a burst.

* * * * *